United States Patent
Abrams et al.

(10) Patent No.: US 10,740,803 B2
(45) Date of Patent: Aug. 11, 2020

(54) SCHEDULING EVENTS FOR A DYNAMIC AUDIENCE PLATFORM

(71) Applicant: Facebook, Inc., Menlo Park, CA (US)

(72) Inventors: Loren William Abrams, San Mateo, CA (US); Jinfu Leng, Newark, CA (US); David Paul Capel, Belmont, CA (US)

(73) Assignee: Facebook, Inc., Menlo Park, CA (US)

(*) Notice: Subject to any disclaimer, the term of this patent is extended or adjusted under 35 U.S.C. 154(b) by 223 days.

(21) Appl. No.: 15/365,571

(22) Filed: Nov. 30, 2016

(65) Prior Publication Data

US 2018/0150887 A1    May 31, 2018

(51) Int. Cl.
*G06Q 30/00* (2012.01)
*G06Q 30/02* (2012.01)
*H04L 29/08* (2006.01)

(52) U.S. Cl.
CPC ..... *G06Q 30/0277* (2013.01); *G06Q 30/0255* (2013.01); *H04L 67/22* (2013.01); *H04L 67/2833* (2013.01); *H04L 67/306* (2013.01)

(58) Field of Classification Search
CPC . G06Q 30/0277; G06Q 30/0269; G06Q 30/02
See application file for complete search history.

(56) References Cited

U.S. PATENT DOCUMENTS

| | | | |
|---|---|---|---|
| 6,298,329 B1 * | 10/2001 | Walker | G06Q 30/0225 705/14.26 |
| 7,827,286 B1 | 11/2010 | Deflaux et al. | |
| 8,800,857 B1 * | 8/2014 | Butler | G06Q 30/0212 235/375 |
| 2002/0052782 A1 * | 5/2002 | Landesmann | G06Q 20/20 705/14.2 |
| 2002/0087410 A1 * | 7/2002 | Walker | G06Q 30/0238 705/14.36 |
| 2003/0065555 A1 * | 4/2003 | von Gonten | G06Q 30/0201 705/7.29 |

(Continued)

OTHER PUBLICATIONS

Aguiar; Predicting Online Video Engagement; IEEE 2015; 10 pages; 2015.*

(Continued)

*Primary Examiner* — Radu Andrei
(74) *Attorney, Agent, or Firm* — Baker & Hostetler LLP

(57) ABSTRACT

A system receives event information describing an event performed by a user with a content provider. The system identifies a property associated with the content provider whose aggregation conditions are satisfied by the event. The system selects an aggregator to which to send the information based on the user. The selected aggregator stores an event entry in its aggregator store with the event information and an indication of the property. The aggregator determines an aggregate value of the user for the property based on event entries in the aggregator store associated with the user and the property. The system provides a content item associated with the content provider to the user based on audience conditions of the property being satisfied by the aggregate value. The system also determines a removal time for each event entry and schedules an aggregation event for updating the user's aggregate value at removal time.

16 Claims, 5 Drawing Sheets

(56) References Cited

U.S. PATENT DOCUMENTS

| | | |
|---|---|---|
| 2004/0002326 A1 | 1/2004 | Maher |
| 2005/0033803 A1 | 2/2005 | Vleet et al. |
| 2005/0037842 A1* | 2/2005 | Kastner ............... G07F 17/3255 463/29 |
| 2006/0112178 A1 | 5/2006 | Van Vleet et al. |
| 2007/0124209 A1* | 5/2007 | Walker ............... G06Q 30/0211 705/14.25 |
| 2007/0208729 A1 | 9/2007 | Martino |
| 2008/0162269 A1 | 7/2008 | Gilbert |
| 2010/0042608 A1 | 2/2010 | Kane |
| 2010/0049663 A1 | 2/2010 | Kane et al. |
| 2011/0093358 A1 | 4/2011 | Stoppelman |
| 2011/0231224 A1 | 9/2011 | Winters |
| 2011/0258085 A1 | 10/2011 | Kane et al. |
| 2012/0016836 A1 | 1/2012 | Fender et al. |
| 2012/0158552 A1 | 6/2012 | Smith |
| 2012/0316961 A1* | 12/2012 | Evans ................. G06F 21/6218 705/14.53 |
| 2013/0159081 A1 | 6/2013 | Shastry et al. |
| 2013/0198030 A1 | 8/2013 | Linden et al. |
| 2013/0204680 A1* | 8/2013 | Suzuki ............... G06Q 30/0241 705/14.4 |
| 2013/0254001 A1* | 9/2013 | Acar ...................... G06Q 30/06 705/14.23 |
| 2014/0067597 A1 | 3/2014 | Kirkby et al. |
| 2017/0061484 A1* | 3/2017 | Jen ..................... G06Q 30/0269 |
| 2018/0150887 A1 | 5/2018 | Abrams et al. |

OTHER PUBLICATIONS

Anonymous; System for Displaying and Interacting with Attributes of Experience Time and Events in a Customer Queue Setting; ip.com 2014; 12 pages; 2014.*

United States Office Action, U.S. Appl. No. 15/365,587, dated Sep. 14, 2018, 14 pages.

United States Office Action, U.S. Appl. No. 15/365,587, dated May 8, 2019, twenty pages.

* cited by examiner

SCHEDULING EVENTS FOR A DYNAMIC AUDIENCE PLATFORM

BACKGROUND

This application relates generally to distributing content items, and in particular to tracking information and management of events for purposes of distributing content items.

Content providers aim to effectively provide content to users. For providing content to the right users, content providers set up certain rules for events that must occur associated with those users in order for the user to meet the criteria for receiving the content. Content providers may then use online systems to track information about users over time and determine if the tracked information indicates the users meet the rules set up by the content provider and thus satisfy the criteria for sending content to users. To effectively provide content to users, content providers would like to determine if the tracked information satisfies criteria as quickly as possible and utilize the most relevant tracked information of the user.

SUMMARY

Embodiments of the present disclosure provide methods for determining if a content item should be provided to a user based on events performed by the user. In one embodiment, when a user performs an event with a content provider system, event information describing the event is sent from the content provider system to the online system. For example, the user may take an action that contributes to a user reaching a state of having met the rules or properties set up by the content provider for receiving the content. The online system identifies a property associated with the content provider system whose aggregation conditions are satisfied by the event. As one example, the property could be that a certain number of events must occur by the user in order for the user to meet the criteria for receiving the content. The online system stores an event entry that includes the event information and an indication of the property whose aggregate conditions are satisfied by the event.

The online system determines an aggregate value of the user for the property based on stored event entries that are associated with the user and the property. If the online system determines that audience conditions of the property are satisfied by the aggregate value, the online system provides a content item associated with the content provider system to the user. For example, the online system determines whether, in aggregate, the user has had occur the number of events required to satisfy the audience conditions/requirements for receiving the content. If audience conditions of the property are not satisfied by the aggregate value, the online system waits until more events occur that are needed to satisfy the audience conditions and result in the content item being provided to the user. The online system also determines a removal time for the stored event entry. The removal time indicates when the event of the entry should no longer be considered in computing the user's aggregate value for the property. The online system schedules an aggregation event for updating the user's aggregate value for the property when removal time is reached. Responsive to reaching the removal time, the online system determines an updated aggregate value based on event entries that are associated with the user and the property. However, the stored event entry associated with the removal time is not used in updating the aggregate value as a result of its removal time being reached.

Figure 1:
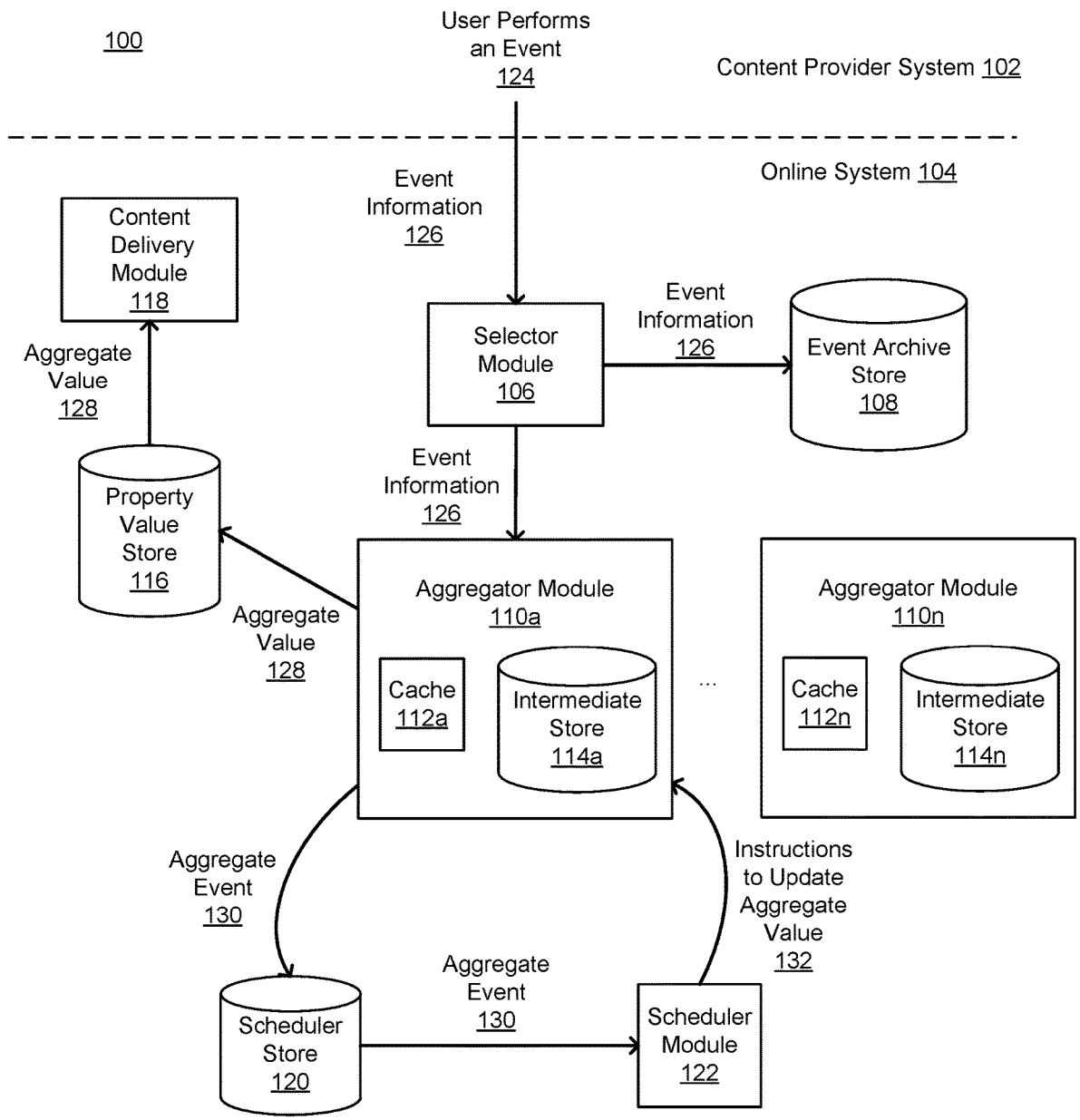
FIG. 1 is a block diagram illustrating a high-level overview of processing an event performed by a user, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "204*a*," indicates the text refers specifically to the element having that particular reference numeral. A reference numeral in the text without a following letter, such as "204," refers to any or all of the elements in the figures bearing that reference numeral (e.g., "204" in the text refers to reference numerals "204*a*," "204*b*" and/or "204*c*" in the figures).

DETAILED DESCRIPTION

Overview

FIG. 1 is a block diagram illustrating a high-level overview 100 of processing an event performed by a user, according to one embodiment. FIG. 1 illustrates operations performed by a content provider system 102 and an online system 104. The content provider system 102 provides users with access to content (e.g., webpages, media content). Through the content provided by the content provider system 102 a user may, for example, browse for and purchase items, view articles, access videos, etc. The online system 104 also provides users with access to content (e.g., social networking content). Entities, such as the content provider system 102 may request that the online system 104 deliver content items (e.g., advertisements) to users. When the content provider system 102 requests that the online system 104 deliver a content item to users, the content provider system 102 defines one or more properties for the content item. A property is the tracking of one or more events for users for purposes of delivering a content item. When a user satisfies audience conditions of the property, the user may be provided with the content item. For example, a property may include tracking how many times each user has made a purchase from the content provider system 102 in the last thirty days. If a user has made at least five purchases from the content provider system 102 in the last thirty days, the user is eligible to receive the content item. Another example is tracking how many times a user viewed a particular product of the content provider (an event) in the last 2 weeks, and if it has been at least three times (three events), the user is eligible to receive a content item about that product that encourages the user to buy the product. Hence, a property defines an audience to which the content provider system 102 wishes to provide the content item.

FIG. 1 illustrates the online system 104 processing an event performed by a user. The user performs an event 124 with the content provider system 102, such as viewing, putting into a shopping cart, or purchasing an item from the content provider system 102. A selector module 106 of the online system 104 receives event information 126 from the content provider system 102 for the event performed by the user. The event information 126 includes, for example, an identifier of the content provider system 102, information of the user (e.g., an identifier associated with the user), an event time when the event occurred, and other information associated with the event. For example, if the event is making a purchase from the content provider system 102, the other information may be the items purchased and the price of the purchase.

The selector module 106 stores the event information 126 in an event archive store 108 of the online system 104. The event archive store 108 includes event information for a history of events for which the online system 104 has received information. The selector module 106 determines that the content provider system 102 is associated with the event from the event information 126 and identifies properties that are associated with the content provider system 102. From the identified properties associated with the content provider system 102, the selector module 106 identifies a property whose aggregate conditions are satisfied by the event. The aggregate conditions indicate when a user's aggregate value for the property should be incremented. For example, the aggregate conditions of the property may indicate that the user's aggregate value for property be incremented when the user makes a purchase from the content provider system 102. The aggregate value indicates how many times the user made a purchase from the content provider system 102 during a period of time.

Since the event satisfies the aggregate conditions of a property, the user's aggregate value for the property is to be updated. From multiple aggregator modules 110a through 110n of the online system 104, the online system 104 selects aggregator module 110a for updating the user's aggregate value for the property. In one embodiment, aggregator module 110a is selected based on aggregator module 110a storing event information for the user. In this embodiment, each aggregator module 110 stores information for a different set of users. In another embodiment, each aggregator module 110 stores information for a different set of properties and aggregator module 110a is selected based on the property whose aggregate conditions are satisfied by the event performed by the user. The selector module 106 transmits the event information 126 to the aggregator module 110a along with information on the property whose aggregate conditions are satisfied by the event.

The aggregator module 110a creates an event entry in a cache 112a of the aggregator module 110a. The event entry includes the event information 126 and an indication of the property whose aggregate conditions are satisfied by the event. In one embodiment, the aggregator module 110a also stores the event entry in an intermediate store 114a of aggregator module 110a. To update the user's aggregate value for the property, the aggregator module 110a determines an aggregation period by identifying a retention period of the property. The retention period indicates for what period of time after an event occurs, the event should be used in computing the aggregate value. For example, if the property involves tracking the number of purchases by a user in the last thirty days, the retention period is thirty days. The aggregator module 110a determines the aggregation period to be between the current time (t) and the current time minus the retention period (t-retention period). Using the intermediate store 114a and/or the cache 112a, the aggregator module 110a identifies stored event entries associated with the property and the user whose event times are within the aggregation period. The aggregator module 110a determines the user's new aggregate value to be the number of event entries identified. Continuing with the purchases in the last thirty days example, by limiting the entries identified to be within the aggregation period, the aggregator module 110a only identifies entries of the user for purchases that occurred within the last thirty days. The aggregator module 110a stores the aggregate value 128 in the property value store 116. If the property value store 116 already includes an aggregate value of the user for the same property, the aggregator module 110a replaces it with the new aggregate value determined. The property value store 116 includes the aggregate values of users for different properties.

The content delivery module 118 periodically checks whether the aggregate value 128 satisfies the audience conditions of the respective property (e.g., is the aggregate value 128 greater than a threshold). If the aggregate value 128 satisfies the audience conditions, the content delivery module 118 may provide a content item of the content provider system 102 to the user. For example, the user may only have to satisfy the audience conditions of this property in order to be eligible to receive the content item or the user may have to satisfy the audience conditions of multiple properties in order to be eligible (e.g., user eligible if made more than five purchases in the last thirty days and visited a website of the content provider system 102 more than three times in the last week).

In addition to the aggregator module 110a storing an event entry for the event performed by the user and determining the aggregate value 128, the aggregator module 110a also determines a removal time for the event entry. The removal time indicates when the event of the entry should no longer be considered in computing the user's aggregate value for the property. The aggregator module 110a determines the removal time to be the event time plus the retention period of the property. For example, if the event occurred at 1 PM on Oct. 1, 2016 and the retention period is thirty days, the removal time for the event entry is 1 PM on Oct. 31, 2016. The aggregator module 110a stores an aggregate event 130 in the scheduler store 120 that includes the removal time, an indication of the property, an indication of the user, and an identifier of the aggregator module 110.

A scheduler module 122 of the online system 104 determines when the removal time has been reached. When the removal time has been reached, the scheduler module 122 determines the property and the user identified by the aggregate event 130. The scheduler module 122 provides instructions 132 to the aggregator module 110a identified by the aggregate event 130 to update the user's aggregate value for property. Based on the instructions, the aggregator module 110a determines an aggregation period for identifying event entries to aggregate. The aggregator module 110a determines the aggregation period to be between the current time and the current time minus the retention period of the property. The aggregator module 110a identifies stored event entries associated with the property and the user whose event times are within the aggregation period. The aggregator module 110a determines that the number of event entries identified is the user's new aggregate value and stores it in the property value store 116. Since the removal time of the event entry was reached, the event time of the event entry will not be within the aggregation period. As a result, the event entry is not identified by the aggregator module 110a for aggregation. Essentially, the event entry is removed from the aggregate value when its removal time is reached.

Continuing with the example of the event entry having an event time of 1 PM on October $1^{st}$ and a removal time of 1 PM on October $31^{st}$, at for example 1:01 PM on October $31^{st}$ the aggregator module 110a receives instructions from the schedule module 122 to update the user's aggregate value for the property. The aggregator module 110a determines an aggregation period to be between October $1^{st}$ at 1:01 PM and October $31^{st}$ at 1:01 PM. Thus, the event entry having an event time of 1 PM on October 1st will not be identified by the aggregator module 110a for aggregation since 1 PM on October $1^{st}$ is not within the aggregation period.

Thus, by the online system 104 determining a removal time for each event entry and re-aggregating after the removal time, the online system 104 ensures that the aggregate value for each user is always accurate and up to date. Further, by each aggregator module 110 storing data for specific users and/or properties and having a cache 112 and/or intermediate store 114, the online system 104 is able to quickly identify the information needed to quickly determine an aggregate value for a user. In fact, it performs substantially quicker than would be possible without the cache and/or the intermediate store that allows for quick retrieval of information. This retrieval of information about the user generally has to occur at impression time when a user is loading up a page and the online system must fill open spots with content items. Thus, there is commonly only a few milliseconds (e.g., less than 100 milliseconds, or less than 20 or 10, or even 1-5 milliseconds) to do this retrieval and determine whether the user can be provided with the content item. Overall, this may allow for a page to be loaded by a user with the appropriate content items in less than 5 or 100 milliseconds, or less than 50 or 20 milliseconds.

System Architecture

Figure 2:
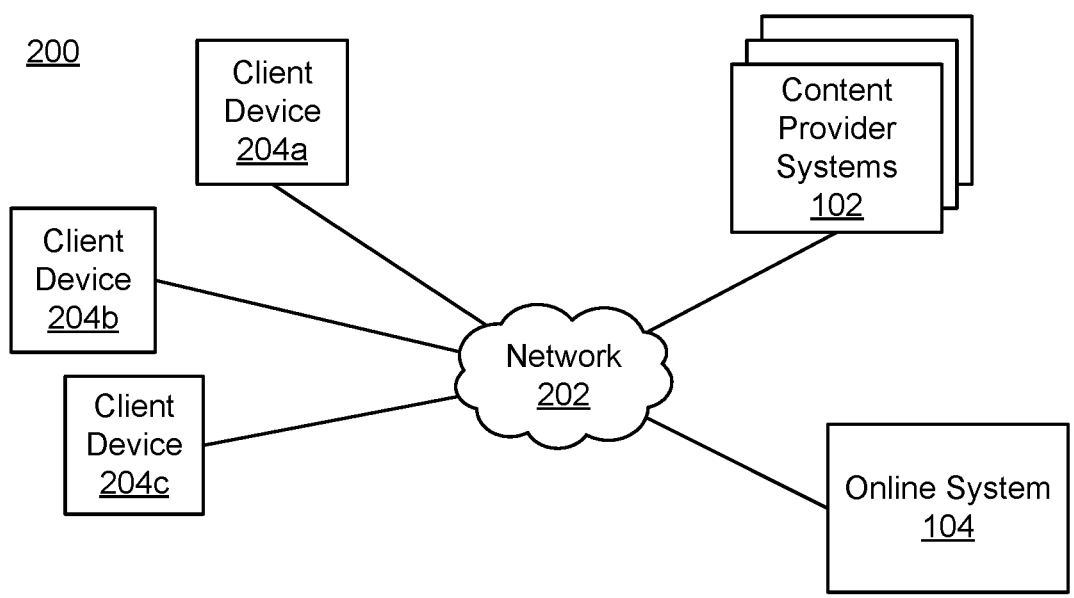
FIG. 2 is a block diagram of a system environment for an online system, according to one embodiment.

FIG. 2 is a block diagram of a system environment for an online system 104, according to one embodiment. The system environment 200 includes client devices 204a, 204b, and 204c, multiple content provider systems 102, and an online system 104 connected via a network 202. In alternative configurations, different and/or additional components may be included in the system environment 200 (e.g., additional client devices 204 and content providers systems 102).

The network 202 represents communications pathways between the client devices 204, the content provider systems 102, and the online system 104. The network 202 may comprise any combination of local area and/or wide area networks, using both wired and/or wireless communication systems. In one embodiment, the network 202 uses standard communications technologies and/or protocols. For example, the network 202 includes communication links using technologies such as Ethernet, 802.11, worldwide interoperability for microwave access (WiMAX), 3G, 4G, code division multiple access (CDMA), digital subscriber line (DSL), etc.

A client device 204 is a computing device capable of receiving user inputs as well as sending and/or receiving data via the network 202. The client device 204 may be a conventional computer system, such as a desktop or a laptop computer, or a mobile device, such as a mobile telephone, a smartphone or a personal digital assistant (PDA). In one embodiment, the user device 110 interacts with other entities in the network 202 through an application programming interface (API) running on a native operating system of the client device 204, such as IOS® or ANDROID™.

A user uses a client device 204 to interact with the content providers systems 102 and/or online system 104. For example, through a client device 204 a user can communicate with the content provider system 102 to obtain content, such as news articles, webpages, text, videos, audio, images, and any other suitable data for presentation to a user. A user may also interact with a content provider system 102 to purchase items or services. A user may also communicate with the online system 104 through a client device 204 to obtain content. For example, the content obtained from the online system 104 may be social networking content such as a profile page and content shared by connections of the user (e.g., comments, posts, messages, images, links, etc.). The online system 104 may also provide content items, such as advertisements to a client device 204.

A content provider system 102 is a computer system of a content provider that provides content to client devices 204. A content provider system 102 may also request that the online system 104 deliver content items to users of the online system 104. As part of the online system 104 delivering content items, a content provider system 102 may notify the online system 104 when certain events occur through user interactions with the content provider system 102. For example, an event could be a user viewing a webpage of the content provider system 102, a user clicking on an advertisement provided by the online system 104 and included with content of the content provider system 102, a user placing an item in a shopping cart, or a user purchasing an item. In one embodiment, the content provider system 102 includes an online system pixel in content provided to users to track and provide information on user interactions to the online system 104. The online system 104 uses the information received from the content providers systems for purposes of delivering content items.

The online system 104 is a computer system that shares content with client devices 204. In one embodiment, the online system 104 is a social networking system that provides social networking content to users. Content provider system 102 may request that online system 104 run campaigns to have specific content items distributed to users of the online system 104. The online system 104 receives from the content provider system 102 content items and properties for determining target audience for each content item. The online system 104 determines if users satisfy properties of content items and delivers content items based on the determination.

Figure 3:
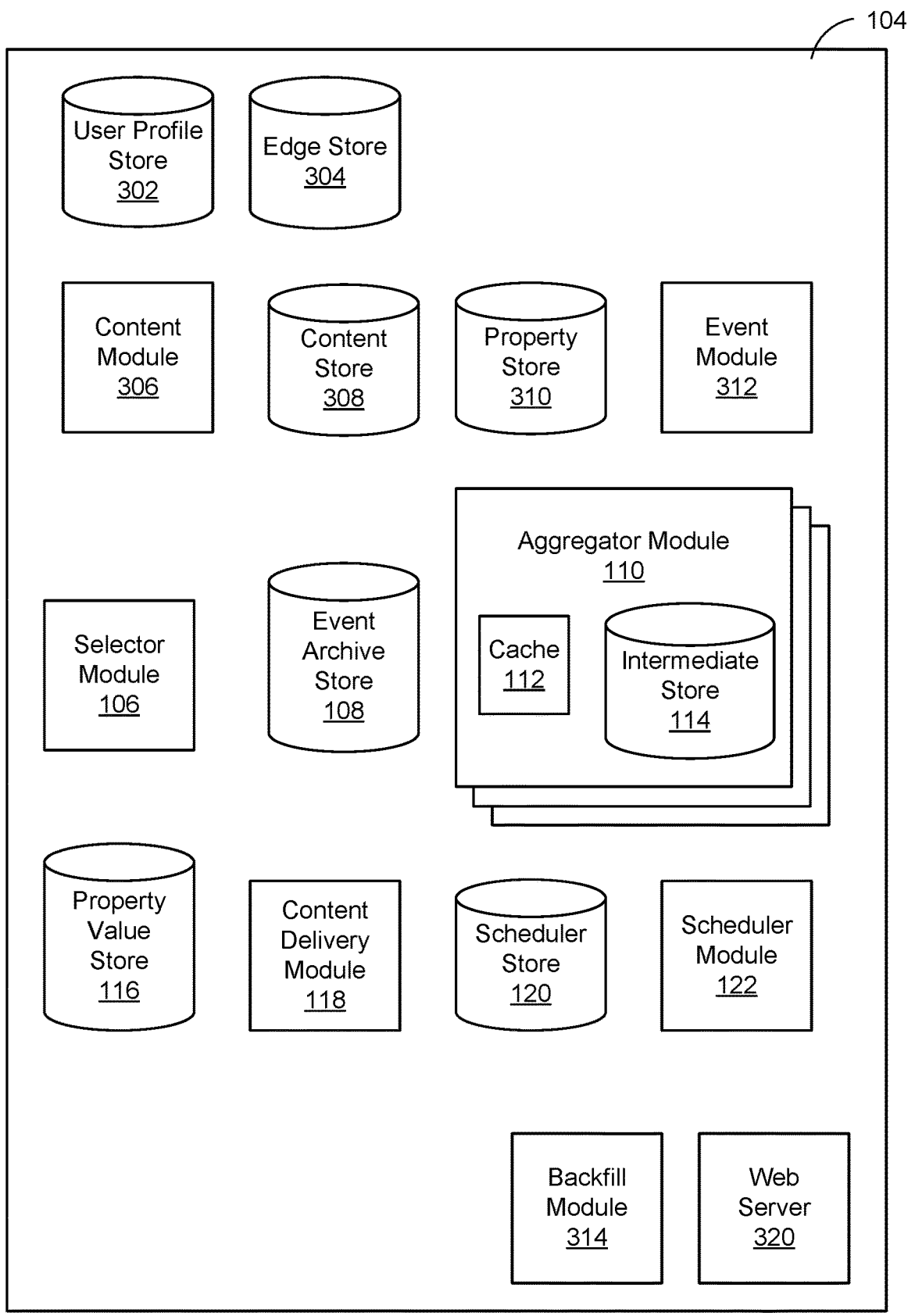
FIG. 3 is a block diagram of an architecture of the online system, according to one embodiment.

FIG. 3 is an example block diagram of the architecture of the online system 104, according to one embodiment. In the embodiment of FIG. 3, the online system 104 includes a user profile store 302, edge store 304, content module 306, content store 308, property store 310, event module 312, selector module 106, event archive store 108, aggregator module 110, property value store 116, content delivery module 118, scheduler store 120, scheduler module 122, backfill module 314, and web server 320. In other embodiments, the online system 104 may include additional, fewer, or different components for various applications. Conventional components such as network interfaces, security functions, load balancers, failover servers, management and network operations consoles, and the like are not shown so as to not obscure the details of the system architecture.

Each user of the online system 104 is associated with a user profile, which is stored in the user profile store 302. The user profile includes declarative information about the user that was explicitly shared by the user and may also include profile information inferred by the online system 104. In one embodiment, a user profile includes multiple data fields, each describing one or more attributes of the corresponding user of the online system 104. Examples of information stored in a user profile include biographic, demographic, and other types of descriptive information such as work experience, educational history, gender, hobbies or preferences, geographical information, that describes characteristics of users. A user profile may also store other information provided by the user, for example, images or videos.

While user profiles in the user profile store 302 are frequently associated with individuals, allowing individuals to interact with each other via the online system 104, user profiles may also be stored for entities such as businesses or organizations. This allows an entity to establish a presence on the online system 104 for connecting and exchanging content with other users of the online system 104. The entity may post information about itself, about its products or provide other information to users of the online system 104 using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

In one embodiment, the edge store 304 stores information describing connections between users and other objects on the online system 104 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 104, such as expressing interest in a page on the social networking system, sharing a link with other users of the social networking system, and commenting on posts made by other users of the social networking system. Users and objects within the online system 104 can be represented as nodes in a social graph that are connected by edges stored in the edge store 304.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 104, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 304 also stores information about edges, such as affinity scores for objects, interests, and other users. Affinity scores, or "affinities," may be computed by the online system 104 over time to approximate a user's affinity for an object, interest, and other users in the online system 104 based on the actions performed by the user. A user's affinity may be computed by the online system 104 over time to approximate a user's affinity for an object, interest, and other users in the online system 104 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 304, in one embodiment. Alternatively, each interaction between a user and a specific object is stored as a separate edge. In some embodiments, connections between users may be stored in the user profile store 302, or the user profile store 302 may access the edge store 304 to determine connections between users.

The content module 306 processes requests from content provider systems 102 regarding content items. A content provider system 102 may request that the online system 104 deliver content items to users of the online system 104. In one embodiment, a content item is an advertisement. In another embodiment, a content item encourages a user to perform an interaction with the online system 104. The interaction may be a social interaction, such as encouraging a user to establish a connection in a social network or encouraging a user to view content (e.g., a picture) shared by another user.

When a content provider system 102 requests that a content item be delivered to users, the content module 306 communicates with the content provider system 102 to create one or more properties whose conditions have to be satisfied by a user in order for the user to be eligible to receive the content item. A property is the tracking of occurrences of an event for users for purposes of delivering content items. Through communications with the content provider system 102, a property is created by the content module 306 that includes a namespace, aggregation conditions, a retention period, and audience conditions. A namespace is an identifier of the content provider system 102. The namespace indicates that the property is associated with (e.g., created for) the content provider system 102. Aggregation conditions indicate conditions that need to be satisfied by a user event in order for a user's aggregate value for the property to be incremented. The user's aggregate value for the property is an indication of the number of events performed by the user during a time period that satisfied the aggregation conditions. For example, aggregation conditions could be a user performing an event that comprises placing an item in a shopping cart of the content provider system 102.

The retention period of the property indicates for what period of time after an event occurs that satisfies the aggregation conditions, the event should be used in determining the aggregate value. For example, assume the retention period is seven days. When an event occurs that satisfies the aggregation conditions, the event will be counted in computing the aggregate value. However, seven days after the event occurred, the event is no longer counted as part of computing the aggregate value. The audience conditions indicate conditions that need to be met by a user's aggregate value in order for the property to be satisfied by the user. Continuing with the same example, audience conditions could be that a user's aggregate value for the property be greater than or equal to three. Hence, if a user's aggregate value for a property indicates that the user placed items in the shopping cart three times in the last seven days, the audience conditions are met and the user may be eligible to receive the content item.

The content module 306 stores the content item received from the content provider system 102 in the content store 308. With the content item the content module 306 stores indications of the properties associated with the content item. The information stored in the content store 308 is used by the content delivery module 118 to deliver content items to users eligible to receive the content items. Additionally, the content module 306 stores the properties in the property store 310. The information stored in the property store 310 is used by selector module 106 to select properties, by the aggregator module 110 to determine aggregate values, and the content delivery module 118 to determine which users are eligible to receive content items.

Based on the properties created for the content item, the online system 104 may need to track events that occur through user interaction with the content provider system 102. For an event that needs to be tracked, the online system 104 may provide an online system pixel to the content provider system 102 to include with content of the content provider system 102. For example, the tracking pixel may be a segment of HTML code resulting in a transparent 1×1 image or an iframe added to pages on its website, such as a product page describing a product, on a shopping cart page that the user visits upon putting something into a shopping cart, on a checkout page that the user visits to checkout and purchase a product, etc. Online system pixels allow the online system 104 to track events that occur through user interactions with the content provider system 102. The online system pixel will send information back to the online system 104 when content of the content provider system 102 is accessed by a user. For example, when a user's browser loads a page having the tracking pixel, the tracking pixel results in the user's browser attempting to retrieve the content for that pixel, and the browser contacts the online system to retrieve the content. The request sent to the online system, however, actually includes various data about the user's actions taken on the website. Events for which the online system 104 may receive information from a content provider system 102 may include, for example, one or more of the following: viewing content, searching, adding items to a cart, adding items to a wishlist, initiating checkout of item, adding payment information, making a purchase, submitting a form, signing up for a trial, logging into an account, accessing a pricing page, completing a subscription, and signing up for a service. The content provider system 102 may also specify a custom event for the online system pixel to track. For example, a custom event may be adding a particular type of item to a shopping cart or making a purchase greater than a certain value.

The content provider can also control what data is sent to the online system upon firing of the tracking pixel. For example, the content provider may include information about the page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system can also be retrieved by the online system, which can include various data about the user, such as the online systems' UID for the user, information about the client device and the browser, such as the Internet Protocol (IP) address of the client device, among other data.

Tracking can also be performed on mobile applications of content providers by using a software development kit (SDK) of the online system or via an application programming interface (API) of the online system to track events (e.g., purchases) that occur by users on the content provider's app that are reported to the online system.

The event module 312 processes event information received by the online system 104. When a user performs an event with a content provider system 102 and the content provider system 102 transmits event information for the event to the online system 104, the event module 312 receives the event information. The transmittal of the event information can be triggered, for example, by an online system pixel. In one embodiment, the event information includes a namespace identifying the content provider system 102, information of the user that engaged in the event, event time indicating when the event occurred, and information describing the event that the user engaged in (e.g., placed item in cart, checked out, etc). The event module 312 provides the event information of the event to the selector module 106. The event module 312 may format, standardize or supplement the event information before sending the event information to the selector module 106.

The selector module 106 determines properties satisfied by the event and selects an aggregator module 110 to process the event. In one embodiment, the selector module 106 receives the event information from the event module 312 and stores the event information in the event archive store 108. The event archive store 108 includes event information for each event for which the online system 104 has received information. In another embodiment, instead of the selector module 106 storing the event information in the event archive store 108, the event module 312 stores event information when it is received.

The selector module 106 determines the content provider system 102 associated with the event from the namespace included in the event information. The selector module 106 identifies properties from the property store 310 that are associated with the content provider system 102. From the identified properties, the selector module 106 determines the properties whose aggregate conditions are satisfied by the event described by the event information.

Additionally, the selector module 106 selects from the multiple aggregator modules 110, an aggregator module 110 assigned to the user that engaged in the event. In this embodiment, each aggregator module 110 stores information for a different set of users. Since each aggregator module 110 has at least one store, by selecting the aggregator module 110 assigned to the user, the selector module 106 is selecting the store of the aggregator module 110 for storing the event information as described in more detail below with reference to the aggregator module 110. The selector module 106 transmits the event information to the selected aggregator module 110 along with an indication of the determined properties whose aggregate conditions are satisfied by the event. In another embodiment, each aggregator module 110 stores information for a different set of properties and aggregator module 110 are selected based on the properties whose aggregate condition are satisfied by the event performed by the user. Hence, in this embodiment, multiple aggregator modules 110 may be selected.

An aggregator module 110 processes event information and computes an aggregate value for each property whose aggregate conditions are satisfied. Each aggregator module 110 includes a cache 112 and an intermediate store 114. The cache 112 and the intermediate store 114 may each be referred to as an aggregator store. Additionally, the cache 112 and the intermediate store 114 may collectively be referred to as an aggregator store. In another embodiment, instead of each aggregator module 110 including a cache 112 and an intermediate store 114 as shown in FIG. 3, an intermediate store 114 may be shared by multiple aggregator modules 110 but each aggregator module 110 still includes its own cache 112. In one embodiment, each aggregator module 110 is a separate computer system.

When an aggregator module 110 receives from the selector module 106 event information along with an indication of the determined properties whose aggregate conditions are satisfied by an event, for each determined property, the aggregator module 110 stores an event entry in the cache 112 of the aggregator module 110. The event entry includes the event information along with an indication of the property. In one embodiment, the aggregator module 110 also stores the event entry in the intermediate store 114. In one embodiment, the aggregator module 110 first stores the event entry in the cache 112 and if the event entry is not accessed within a period of time it is then moved over to the intermediate store 114. In one embodiment, the event entry is stored as a key value pair. The key is comprised of the property, an identifier of the user who performed the event, and the event time when the event occurred. The value is the event information.

After storing the event information, the aggregator module 110 determines, for each property whose aggregate conditions are satisfied, an aggregate value for the user that performed the event. As part of determining a user's aggregate value for a property, the aggregator module 110 determines an aggregation period. The aggregator module 110 determines that aggregation period to be between the current time (t) and the current time minus the retention period of the property (t-retention period). Using the aggregator store of the aggregator module 110 (i.e., the cache 112 and/or the intermediate store 114), the aggregator module 110 identifies stored event entries whose event time is within the aggregation period and that are associated with the property and the user. The aggregator module 110 determines the aggregate value to be the number of event entries identified. The aggregator module 110 stores the aggregate value in the property value store 116. The property value store 116 includes the aggregate values of properties for different users. If the property value store 116 already includes an aggregate value of the user for the same property, the aggregator module 110 replaces it with the new aggregate value determined.

In addition, the aggregator module 110 also determines a removal time for a stored event entry. The removal time indicates when the event of the entry should no longer be considered in computing the user's aggregate value for the property. The aggregator module 110 determines the removal time to be the event time of the event plus the retention period of the property. The aggregator module 110 stores an aggregate event in the scheduler store 120. The aggregate event includes the removal time, an indication of the property, an indication of the user, and an identifier that identifies the aggregator module 110. The scheduler store 120 includes aggregate events for event entries.

The content delivery module 118 delivers content items to the users. The content delivery module 118 periodically checks the property value store 116 for aggregate values to see whether the aggregate value satisfies the audience conditions of the respective property (e.g., is the aggregate value greater than a threshold). If the aggregate value satisfies the audience conditions, the content delivery module 118 determines that the user satisfies the property. The content delivery module 118 determines whether the user now satisfies each property of a content item stored in the content store 308. If the user satisfies each property of a content item, the content delivery module 118 determines that the user is eligible to receive the content item. When an opportunity arises to present a content item to the user, the content delivery module 118 considers the eligible content items in selecting a content item to present to the user. For example, the content delivery module 118 may use an auction process to select the content item from the content items that the user is eligible to receive. The content delivery module 118 retrieves the selected content item from the content store 308 and transmits the selected content item to the client device 204 of the user.

The scheduler module 122 monitors the aggregate events stored in the scheduler store 120. When the removal time associated with an aggregate event is reached, the scheduler module 122 determines the aggregator module 110, the property, and the user identified by the aggregate event. The scheduler module 122 instructs the aggregator module 110 to update the user's aggregate value for the property.

The backfill module 314 assists in determining aggregate values for newly created properties. Assume that a property is created by a user to track the number of times users made a purchase from a content provider system 102 in the last seven days. When the property is created, if an aggregator module 110 were to determine the aggregate value for a user for the property at that point, the aggregator module 110 would determine that the user's aggregate value is zero because there are no event entries yet in its respective aggregator store (i.e., cache 112 and intermediate store 114) for the property. However, the user may have made a purchase from the content provider system 102 five days ago. Hence, the user's aggregate value for the property in the property value store 116 would be inaccurate. The backfill module 314 assists by using the event archive store 108 to provide the aggregator modules 110 with information of events that occurred prior to the creation of the property. Since the event archive store 108 includes a history of events that have occurred, the event archive store 108 will have information on events that occurred prior to the creation of the property.

As a result, when a new property is created by a content provider system 102, the backfill module 314 searches the event archive store 108 for events that satisfy the aggregate conditions of the property. In one embodiment, the backfill module 314 searches the event archive store 108 for events that satisfy the aggregate conditions of the property and whose event times are within an aggregation period. The aggregation period is between the current time (t) and the current time minus the retention period of the property (t-retention period).

For each event identified according to the searching, the backfill module 314 selects an aggregator module 110 based on the user that performed the event and transmits the event information of the event to selected aggregator module 110. The aggregator modules 110 processes the event information received from the backfill module 314 like it processes event information received from the selector module 106 (i.e., by storing the event information and determining aggregate values). Hence, by the aggregator modules 110 receiving event information for events that occurred prior to the creation of the property, the aggregator values determined by the aggregator module 110 will be accurate. In one embodiment, the aggregator modules 110 process the event information received from the backfill module 314 in batches.

The web server 320 links the online system 104 via the network 202 to the one or more client devices 204, as well as to the one or more content provider system 102. The web server 320 serves web pages, as well as other web-related content, such as JAVA®, FLASH®, XML and so forth. The web server 320 may receive and route messages between the online system 104 and the client device 204, for example, instant messages, queued messages (e.g., email), text messages, short message service (SMS) messages, or messages sent using any other suitable messaging technique. A user may send a request to the web server 320 to upload information (e.g., images or videos). Additionally, the web server 320 may provide application programming interface (API) functionality to send data directly to native client device operating systems, such as IOS®, ANDROID™, WEBOS® or RIM®.

Event Processing

Figure 4:
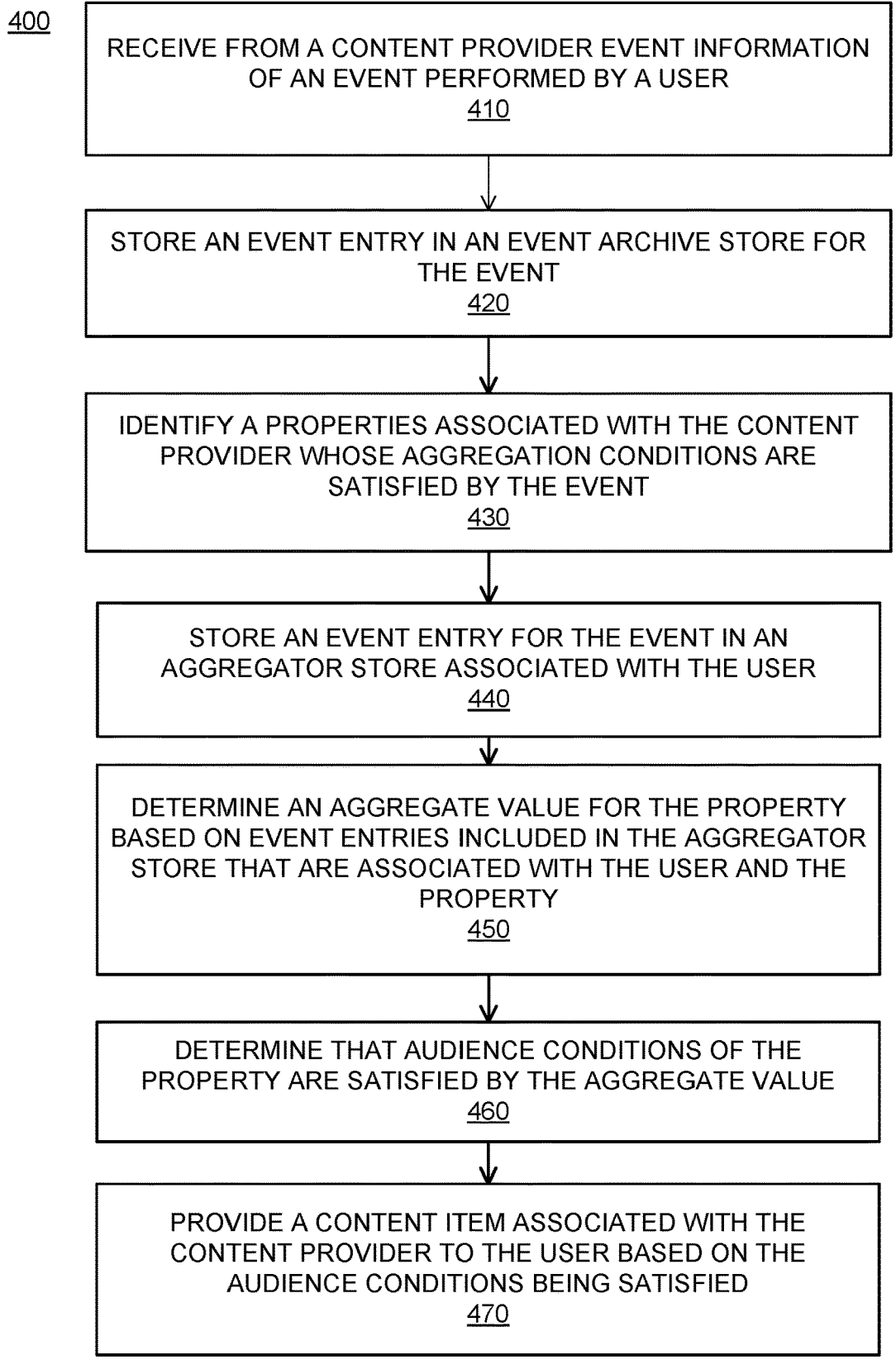
FIG. 4 is a flowchart illustrating a process for processing an event performed by a user, according to one embodiment.

FIG. 4 is a flowchart 400 illustrating a process for processing an event performed by a user, according to one embodiment. The online system 104 receives 410 from a content provider system 102 information of an event performed by a user. For example, the online system 104 may receive this information via an online system pixel on a website of the content provider system 102. The online system 104 stores 420 an event entry in an event archive store 108 for the event. The event entry includes the event information. The online system 104 identifies 430 a property associated with the content provider system 102 whose aggregate conditions are satisfied by the event. The online system 104 stores 440 an event entry for the event in an aggregator store associated with the user. The online system 104 determines 450 an aggregate value of the user for the property based on event entries included in the aggregator store that are associated with the user and the property. The online system 104 determines 460 that audience conditions of the property are satisfied by the aggregate value. The online system 104 provides 470 a content item associated with the content provider system 102 to the user based on the audience conditions being satisfied.

Updating Aggregate Value of Property at Removal Time

Figure 5:
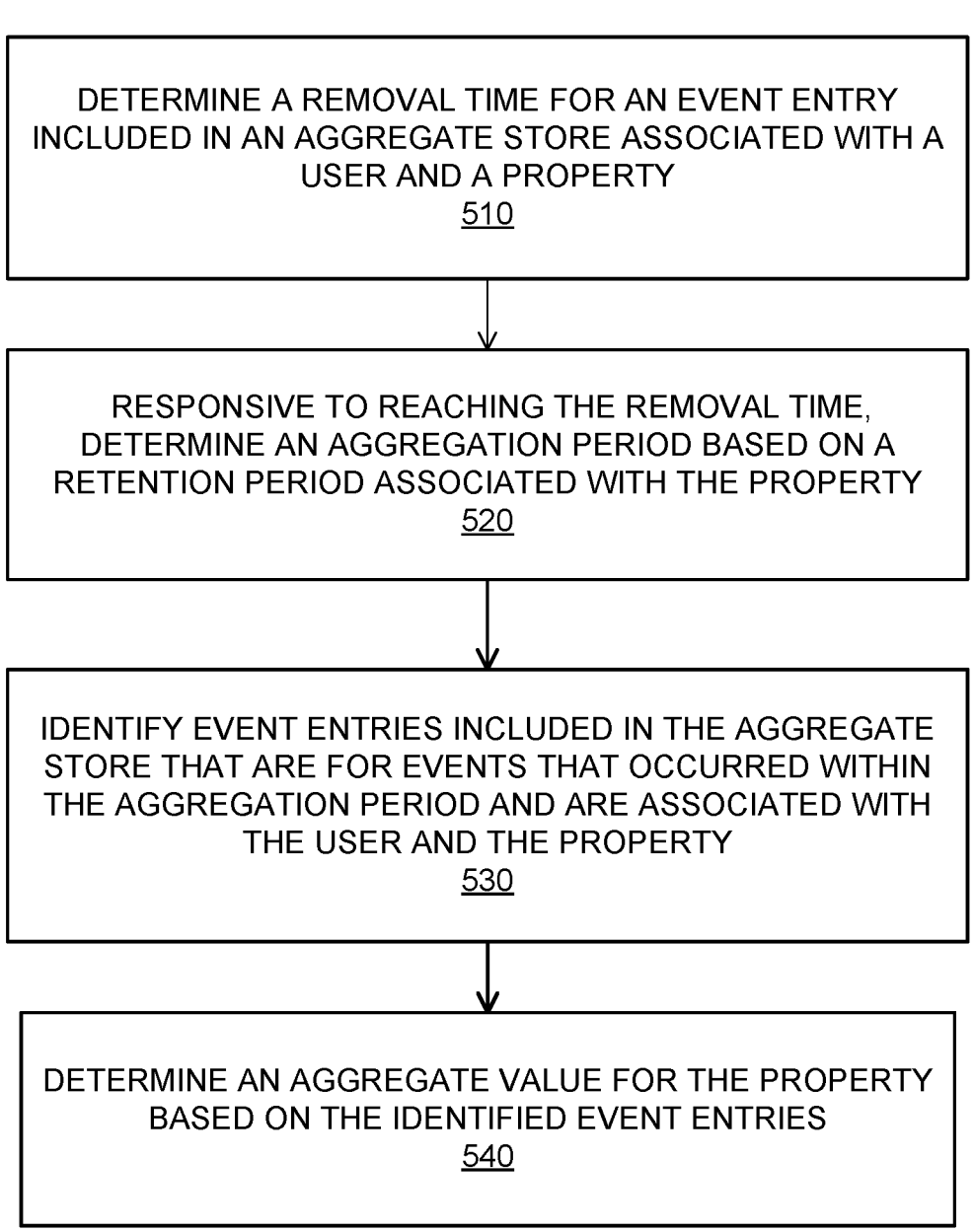
FIG. 5 is a flowchart illustrating a process for updating the aggregate value of a property at removal time, according to one embodiment.

FIG. 5 is a flowchart 500 illustrating a process for updating the aggregate value of a property at removal time, according to one embodiment. The online system 104 determines 510 a removal time for an event entry included in an aggregator store that is associated with a user and a property. The event entry includes event information for an event performed by the user. In one embodiment, the removal time is the event time of when the event occurred plus the retention period associated with the property. Responsive to reaching the removal time, the online system 104 determines 520 an aggregation period based on the retention period associated with the property. The online system 104 identifies 530 event entries included in the aggregator store that are for events that occurred within the aggregation period and are associated with the user and the property. The online system 104 determines 540 an aggregate value of the user for the property based on the identified event entries.

Those of the skill in the art will recognize that other embodiments can perform the steps of FIGS. 4 and 5 in different orders. Moreover, other embodiments can include different and/or additional steps than the ones described herein.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computer system, a request to create a property for a content item, wherein the property defines events that must be performed by a user for the user to satisfy a condition for being included in an audience for the content item, and the property includes a retention period indicating for what period of time after an event occurs that the event should be used to satisfy the condition such that events occurring at different times have different removal times for when each event should no longer be used to satisfy the condition;

identifying, by the computer system, event information for an event performed by the user, the event information including an event time associated with the event;

selecting, by the computer system, from a plurality of storages, a storage in which to store the event information based on the user being assigned to the storage;

storing, by the computer system, an event entry that includes the event information and is associated with the user in the selected storage, the selected storage comprising at least one of a cache and an intermediate store;

determining, by the computer system, a first aggregate value based on a first plurality of event entries associated with the user that are stored in the selected storage, the first plurality of event entries including the stored event entry and the first aggregate value indicating a number of times the user performed events during a first time period that includes the event time;

providing, by the computer system, the content item to the user based on the first aggregate value satisfying the condition for being included in the audience for the content item;

determining, by the computer system, a removal time for the stored event entry, wherein the removal time is the event time plus the retention period associated with the property; and responsive to reaching the removal time, determining, by the computer system, an aggregation period to be between a current time and the current time minus the retention period of the property, identifying a second plurality of event entries for events that occurred within the aggregation period associated with the user and the property, and determining a second aggregate value based on the second plurality of event entries associated with the user which are stored event entries associated with the user that have not reached a corresponding removal time, the second plurality of event entries not including the stored event entry which has reached the removal time, and the second aggregate value indicating a number of times the user performed events during a second time period that does not include the event time.

2. The computer-implemented method of claim 1, wherein the content item is associated with a content provider.

3. The computer-implemented method of claim 1, further comprising determining not to provide an additional content item to the user based on the second aggregate value.

4. The computer-implemented method of claim 1, further comprising:

associating the stored event entry with a property associated with a content provider based on the event satisfying aggregate conditions of the property; and identifying the first plurality of event entries based on each of the first plurality of event entries being associated with the property and describing an event that occurred during the first time period.

5. The computer-implemented method of claim 1, wherein the first time period is between a current time when determining the first aggregate value and the current time when determining the first aggregate value minus the retention period of the property.

6. The computer-implemented method of claim 1, wherein the stored event entry is associated with a property of a content provider.

7. The computer-implemented method of claim 1, wherein the event information is for an event performed by the user with a content provider system.

8. The computer-implemented method of claim 1, wherein the first plurality of event entries and the second plurality of event entries are stored in the selected storage.

9. A non-transitory computer-readable storage medium storing executable computer program instructions, the computer program instructions comprising instructions for:

receiving, by a computer system, a request to create a property for a content item, wherein the property defines events that must be performed by a user for the user to satisfy a condition for being included in an audience for the content item, and the property includes a retention period indicating for what period of time after an event occurs that the event should be used to satisfy the condition such that events occurring at different times have different removal times for when each event should no longer be used to satisfy the condition;

identifying, by the computer system, event information for an event performed by the user, the event information including an event time associated with the event;

selecting, by the computer system, from a plurality of storages, a storage in which to store the event information based on the user being assigned to the storage;

storing, by the computer system, an event entry that includes the event information and is associated with the user in the selected storage, the selected storage comprising at least one of a cache and an intermediate store;

determining, by the computer system, a first aggregate value based on a first plurality of event entries associated with the user that are stored in the selected storage, the first plurality of event entries including the stored event entry and the first aggregate value indicating a number of times the user performed events during a first time period that includes the event time;

providing, by the computer system, the content item to the user based on the first aggregate value satisfying the condition for being included in the audience for the content item;

determining, by the computer system, a removal time for the stored event entry, wherein the removal time is the event time plus the retention period associated with the property; and responsive to reaching the removal time, determining, by the computer system, an aggregation period to be between a current time and the current time minus the retention period of the property, identifying a second plurality of event entries for events that occurred within the aggregation period associated with the user and the property, and determining a second aggregate value based on the second plurality of event entries associated with the user which are stored event entries associated with the user that have not reached a corresponding removal time, the second plurality of event entries not including the stored event entry which has reached the removal time, and the second aggregate value indicating a number of times the user performed events during a second time period that does not include the event time.

10. The computer-readable storage medium of claim 9, wherein the content item is associated with a content provider and the content item is provided to the user based on the first aggregate value satisfying audience conditions of a property associated with the content provider.

11. The computer-readable storage medium of claim 9, further comprising instructions for determining not to provide an additional content item to the user based on the second aggregate value.

12. The computer-readable storage medium of claim 9, further comprising instructions for:
  associating the stored event entry with a property associated with a content provider based on the event satisfying aggregate conditions of the property; and
  identifying the first plurality of event entries based on each of the first plurality of event entries being associated with the property and describing an event that occurred during the first time period.

13. The computer-readable storage medium of claim 9, wherein the first time period is between a current time when determining the first aggregate value and the current time when determining the first aggregate value minus the retention period of the property.

14. The computer-readable storage medium of claim 9, wherein the stored event entry is associated with a property of a content provider.

15. The computer-readable storage medium of claim 9, wherein the event information is for an event performed by the user with a content provider system.

16. The computer-readable storage medium of claim 9, wherein the first plurality of event entries and the second plurality of event entries are stored in the selected storage.

* * * * *